United States Patent
Wollenweber et al.

(10) Patent No.: US 7,549,291 B2
(45) Date of Patent: Jun. 23, 2009

(54) METHODS AND APPARATUS FOR OPERATING GAS TURBINE ENGINES

(75) Inventors: Gary Craig Wollenweber, Cincinnati, OH (US); John B. Turco, West Chester, OH (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 11/032,561

(22) Filed: Jan. 10, 2005

(65) Prior Publication Data
US 2005/0210863 A1    Sep. 29, 2005

Related U.S. Application Data

(63) Continuation-in-part of application No. 10/799,523, filed on Mar. 12, 2004, now Pat. No. 7,121,078, which is a continuation-in-part of application No. 10/352,446, filed on Jan. 28, 2003, now Pat. No. 6,968,674.

(51) Int. Cl.
*F02C 6/00*    (2006.01)

(52) U.S. Cl. ........................ 60/772; 60/224; 60/226.1

(58) Field of Classification Search ............... 60/39.15, 60/224, 225, 226.1, 263, 772, 795
See application file for complete search history.

(56) References Cited

U.S. PATENT DOCUMENTS

| | | | | |
|---|---|---|---|---|
| 2,677,932 | A | * | 5/1954 | Forsling ............... 60/39.15 |
| 3,442,082 | A | * | 5/1969 | Peterson ............... 60/224 |
| 4,192,137 | A | | 3/1980 | Chappell et al. |
| 4,222,233 | A | | 9/1980 | Johnson et al. |
| 4,631,914 | A | | 12/1986 | Hines |
| 5,160,080 | A | | 11/1992 | Hines et al. |
| 5,269,134 | A | * | 12/1993 | Menioux ............... 60/224 |
| 6,457,305 | B1 | | 10/2002 | Schierbaum |
| 6,634,596 | B2 | | 10/2003 | Albero et al. |
| 6,868,664 | B2 | * | 3/2005 | Albero et al. ............. 60/224 |

FOREIGN PATENT DOCUMENTS

GB        2074654    * 11/1981

\* cited by examiner

*Primary Examiner*—Louis J Casaregola
(74) *Attorney, Agent, or Firm*—William Scott Andes, Esq.; Armstrong Teasdale LLP

(57) ABSTRACT

A gas turbine engine assembly includes at least one propelling gas turbine engine and an auxiliary engine used for generating power. The propelling gas turbine engine includes a fan assembly and a core engine downstream from said fan assembly. The core engine includes a compressor, a high pressure turbine, a low pressure turbine, and a booster turbine coupled together in serial-flow arrangement such that the booster turbine is rotatably coupled between the high and low pressure turbines. The auxiliary engine includes at least one turbine and an inlet. The inlet is upstream from the high pressure turbine and is in flow communication with the propelling gas turbine engine core engine, such that a portion of airflow entering the propelling engine is extracted for use by the auxiliary engine.

8 Claims, 2 Drawing Sheets

METHODS AND APPARATUS FOR OPERATING GAS TURBINE ENGINES

CROSS REFERENCE TO RELATED APPLICATION

This application is a continuation-in-part of U.S. patent application Ser. No. 10/799,523 filed Mar. 12, 2004 now U.S. Pat. No. 7,121,078, which is a continuation-in-part of U.S. patent application Ser. No. 10/352,446 filed Jan. 28, 2003 now U.S. Pat. No. 6,968,674, both of which are assigned to assignee of the present invention, and both of which are hereby incorporated by reference.

BACKGROUND OF THE INVENTION

This invention relates generally to the gas turbine engines, and, more particularly, to methods and apparatus for operating gas turbine engines used for aircraft propulsion and auxiliary power.

Gas turbine engines typically include a compressor for compressing air. The compressed air is mixed with a fuel and channeled to a combustor, wherein the fuel/air mixture is ignited within a combustion chamber to generate hot combustion gases. The combustion gasses are channeled to a turbine, which extracts energy from the combustion gases for powering the compressor, as well as producing useful work. The exhaust gases are then discharged through an exhaust nozzle, thus producing a reactive, propelling force.

Modern aircraft have increased hydraulic and electrical loads. An electrical load demanded of gas turbine engines increases as flight computers, communication equipment, navigation equipment, radars, environmental control systems, advanced weapon systems, and defensive systems are coupled to aircraft. A hydraulic load demanded of gas turbine engines increases as flight controls, pumps, actuators, and other accessories are coupled to the aircraft. Within at least some known aircraft, mechanical shaft power is used to power hydraulic pumps, electrical generators and alternators. More specifically, electrical and hydraulic equipment are typically coupled to an accessory gearbox that is driven by a shaft coupled to the turbine. When additional electrical power or hydraulic power is required, additional fuel is added to the combustor until a predefined maximum temperature and/or power operating level is reached.

Because the density of air decreases as the altitude is increased, when the aircraft is operated at higher altitudes, the engine must work harder to produce the same shaft power that the engine is capable of producing at lower altitudes. As a result of the increased work, the turbine may operate with increased operating temperatures, such that the shaft power must be limited or reduced to prevent exceeding the engine predefined operating limits.

Within at least some known gas turbine engines, electrical power and hydraulic power is also generated by an auxiliary power unit (APU). An APU is a small turbo-shaft engine that is operated independently from the gas turbine engines that supply thrust for the aircraft. More specifically, because APU operation is also impacted by the air density and is also operationally limited by predefined temperature and performance limits, APUs are typically only operated when the aircraft is on the ground, or in emergency situations while the aircraft is in flight.

BRIEF DESCRIPTION OF THE INVENTION

In one aspect, a method for assembling a gas turbine engine assembly is provided. The method comprises providing at least one propelling gas turbine engine that includes a core engine including a compressor, a high pressure turbine, and a booster turbine coupled together in serial-flow arrangement, and coupling an auxiliary engine to the propelling gas turbine engine such that during operation of the propelling gas turbine engine, at least a portion of the airflow entering the propelling gas turbine engine is selectively extracted from the propelling gas turbine engine upstream from the core engine high pressure turbine, and channeled to the auxiliary engine for generating power.

In another aspect, a gas turbine engine assembly is provided. The gas turbine engine assembly includes at least one propelling gas turbine engine and an auxiliary engine used for generating power. The propelling gas turbine engine includes a fan assembly and a core engine downstream from said fan assembly. The core engine includes a compressor, a high pressure turbine, a low pressure turbine, and a booster turbine coupled together in serial-flow arrangement such that the booster turbine is rotatably coupled between the high and low pressure turbines. The auxiliary engine includes at least one turbine and an inlet. The inlet is upstream from the booster turbine and is in flow communication with the propelling gas turbine engine core engine, such that a portion of airflow entering the propelling engine is extracted for use by the auxiliary engine.

DETAILED DESCRIPTION OF THE INVENTION

Figure 1:
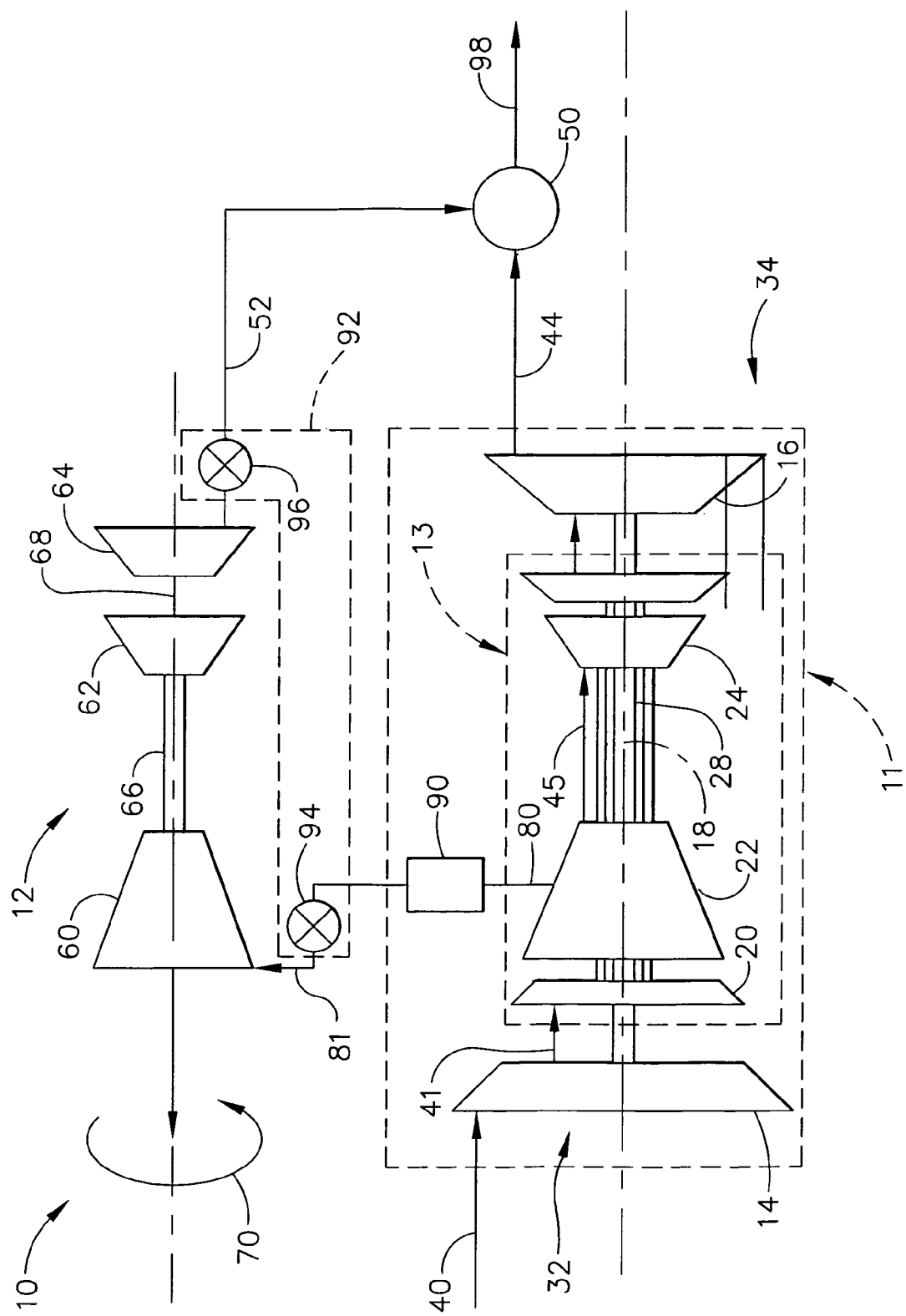
FIG. 1 is an exemplary schematic view of a gas turbine engine assembly.

FIG. 1 is an exemplary schematic view of a gas turbine engine assembly 10 including a propelling gas turbine engine 11 and an auxiliary power unit or auxiliary power engine 12 that are coupled together, as described in more detail below, in a combined cycle. More specifically, gas turbine engine assembly 10, as described in more detail below, facilitates producing shaft power and propelling force for an aircraft (not shown).

Gas turbine engine 11 includes a core engine 13 and a fan assembly 14 and a low pressure turbine assembly 16. Fan assembly 14 and low pressure turbine 16 are coupled by a first shaft 18. Core engine 13 includes a core drive fan 20, a high-pressure compressor 22, a combustor (not shown), and a high-pressure turbine 24. In the exemplary embodiment, core drive fan 20, compressor 22, the combustor, and turbines 24 and 16 are coupled together in axial flow communication. Core drive fan 20, compressor 22, and high pressure turbine 24 are coupled by a second shaft 28. Gas turbine engine 11 also includes an inlet side 32 and an exhaust side 34. In one embodiment, engine 11 is a F118-GE-100 turbofan engine commercially available from General Electric Aircraft Engines, Cincinnati, Ohio.

In operation, inlet air, represented by arrow 40, enters fan assembly 14, wherein the air is compressed and is discharged downstream, represented by arrow 41, at an increased pressure and temperature towards core engine 13 and more specifically, towards core drive fan 20 wherein the air is channeled towards compressor 22. In one embodiment, engine 11 includes a bypass duct (not shown), such that a portion of air 41 discharged from fan assembly 14 is channeled into the bypass duct rather than entering core engine 11.

Highly compressed air 45 from compressor 22 is delivered to the combustor wherein it is mixed with fuel and ignited. Combustion gases propel turbines 24 and 16, which drive compressor 22, core drive fan 20, and fan assembly 14, respectively. In the exemplary embodiment, core engine exhaust 44 is discharged from engine 11 to generate a propelling force from gas turbine engine assembly 10.

In the exemplary embodiment, core engine exhaust 44 is channeled to a variable area bypass injector 50 that is coupled in flow communication with core engine exhaust 44 and engine exhaust 52 discharged from or auxiliary power engine 12. In an alternative embodiment, core engine exhaust 44 is channeled to a mixing damper (not shown) that is coupled in flow communication with core engine exhaust 44. In another alternative embodiment, core engine exhaust flow 44 and fan air are discharged separately from auxiliary engine exhaust 52 to produce thrust.

Auxiliary power engine 12 is coupled in flow communication to engine 11, as described in more detail below, and includes a compressor 60, a high-pressure turbine 62, and a low-pressure turbine 64. Compressor 60 and high-pressure turbine 62 are connected by a first shaft 66, such that as combustion gases propel turbine 62, turbine 62 drives compressor 60. Auxiliary engine 12 also includes a second shaft 68 that is coupled to low-pressure turbine 64 to provide shaft power output, represented by arrow 70, for use in the aircraft. For example, power output 70 may be used to drive equipment, such as, but not limited to alternators, generators, and/or hydraulic pumps. In one embodiment, auxiliary power engine 12 is a turbo-shaft engine, such as a T700-GE-701 engine that is commercially available from General Electric Company, Cincinnati, Ohio, and that has been modified in accordance with the present invention.

Auxiliary ducting (not shown) couples auxiliary power engine 12 to engine 11 to enable a portion of compressed air 41 channeled towards core engine 13 to be directed to auxiliary power engine 12. More specifically, in the exemplary embodiment, auxiliary airflow, represented by arrow 80 is extracted from core engine 13 at a location upstream from core engine turbine 24. Moreover, in the exemplary embodiment, airflow 80 is bled from high-pressure compressor 22 and is routed towards auxiliary engine compressor 60. In an alternative embodiment, auxiliary power engine 12 is coupled in flow communication to a pair of engines 11 and receives high pressure airflow 80 from each engine 11. In another alternative embodiment, a pair of auxiliary power engines 12 are coupled in flow communication to a single engine 11 and both receive high pressure airflow 80 from engine 11. More specifically, in the exemplary embodiment, compressor 22 is a multi-staged compressor and air 80 may be extracted at any compressor stage within compressor 22 based on pressure, temperature, and flow requirements of auxiliary engine 12.

In another embodiment, air 80 is extracted upstream or downstream from compressor 22 from any of, or any combination of, but is not limited to being extracted from, a booster interstage, a booster discharge, a fan interstage, a fan discharge, a compressor inlet, a compressor interstage, or a compressor discharge bleed port. In a further alternative embodiment, air 80 is extracted upstream from compressor 22. In one embodiment, approximately up to 10%, or more, of air flowing into compressor 22 is extracted for use by auxiliary engine 12. In a further embodiment, approximately up to 10% or more, of air flowing into fan assembly 14 is extracted for used by auxiliary engine 12. In another embodiment, air is extracted from any of, or any combination of, but is not limited to being extracted from, a location intermediate, or between, fan assembly 14 and core drive fan 20, core drive fan 20 and compressor 22, and compressor 22 and turbine 24.

In an alternative embodiment, engine 11 supplies pressurized or compressed air to auxiliary power engine 12. For example, in one embodiment, compressed air supplied to an aircraft cabin is routed to auxiliary power engine 12 after being used within the aircraft environmental control system. In a further embodiment, auxiliary power engine 12 receives a mixture of airflow from engine 11 and ambient airflow.

Auxiliary airflow 80 directed towards auxiliary engine 12 is at a higher pressure and temperature than inlet airflow 40 entering gas turbine engine assembly 10. Moreover, because auxiliary airflow 80 is at an increased pressure and temperature than the pressure and temperature of airflow 40 entering gas turbine engine assembly 10, a density of airflow 80 is substantially similar to the density of airflow that enters auxiliary engine 12 at lower altitudes. Accordingly, because the power output of auxiliary engine 12 is proportional to the density of the inlet air, during operation of core engine 11, auxiliary engine 12 is operable at higher altitudes with substantially the same operating and performance characteristics that are available at lower altitudes by auxiliary engine 12. For example, when used with the F110/F118 family of engines, auxiliary engine 12 produces approximately the same horsepower and operating characteristics at an altitude of 30-40,000 feet, as would be obtainable if auxiliary engine 12 was operating at sea level independently. Accordingly, at mission altitude, a relatively small amount of high-pressure air taken from core engine 11 will enable auxiliary power engine 12 to output power levels similar to those similar from auxiliary power engine 12 at sea level operation.

In the exemplary embodiment, auxiliary airflow 80 is channeled through an intercooler 90 prior to being supplied to auxiliary engine compressor 60. Intercooler 90 has two airflows (not shown) flowing therethrough in thermal communication with each other, and accordingly, intercooler 90 is designed to exchange a substantial amount of energy as heat, with minimum pressure losses. In the exemplary embodiment, auxiliary airflow 80 is the heat source and a second airflow is used as a heat sink. In one embodiment, the second airflow is fan discharge airflow. In another embodiment, the second airflow is ambient airflow routed through an engine nacelle and passing through intercooler 90 prior to being discharged overboard. More specifically, the operating temperature of auxiliary airflow 80 is facilitated to be reduced within intercooler 90 as the transfer of heat increases the temperature of the other airflow channeled through intercooler 90. In an alternative embodiment, turbine engine assembly 10 does not include intercooler 90.

Intercooler 90 facilitates increasing an amount of power per pound of bleed air 80 supplied to auxiliary power engine 12 without increasing flow rates or changing existing turbine hardware. A control system 92 is coupled to a generator control system (not shown) and facilitates regulating the operating speed of auxiliary power engine 12. In one embodiment, control system 92 throttles inlet air 80 supplied to engine 12 by control of a variable flow area throttle valve 94 and/or controls engine backpressure by control of a variable flow area exit nozzle 96 or a variable area bypass injector 50 to facilitate controlling the operation of auxiliary power engine 12.

Exhaust airflow 52 from auxiliary power engine 12 is channeled towards core engine exhaust 44 at a discharge pressure that is substantially the same as the discharge pressure of exhaust flow 44 discharged from core engine 13. Specifically, in the exemplary embodiment, auxiliary engine exhaust airflow 52 is routed through variable area bypass injector 50 which facilitates mixing exhaust flow 44 exiting core engine 13 with auxiliary engine exhaust airflow 52. More specifically, in the exemplary embodiment, exhaust airflow 52 is reintroduced to core engine exhaust flow 44 upstream from a propelling core engine nozzle (not shown). The mixed exhaust flow 98 is then discharged through an engine nozzle (not shown). In an alternative embodiment, exhaust airflow 52 is not mixed with core engine exhaust flow 44, but rather is discharged to ambient independently from exhaust flow 44.

Accordingly, when operated, auxiliary power engine 12 facilitates providing increased shaft power production for use within the aircraft. More specifically, because auxiliary power engine 12 is selectively operable for shaft power production, auxiliary power engine 12 may be used only when needed, thus facilitating fuel conservation for the aircraft. In addition, the design of gas turbine assembly 10 enables auxiliary power engine 12 to be operated independently of propelling engine 11, such that an operating speed auxiliary power engine 12 is independent of an operating speed of core engine 11. As such, auxiliary power engine 12 may operated during non-operational periods of core engine 11, and moreover, may be used to provide power necessary to start operation of engine 11.

Operation of auxiliary power engine 12 facilitates improving surge margin of engine 11 by bleeding airflow 80 as needed, such that altitude, installation, or distortion effects may be overcome. Moreover, by removing high pressure extraction, auxiliary power engine 12 also facilitates improving an operating performance of core engine 11 while generating significant power. Additionally the hydro mechanical or digital controls of propelling engine 11 and auxiliary power engine 12 are arranged to mutually exchange operational status and performance parameter values (pressure, temperature, RPM, etc) from one to the other.

Figure 2:
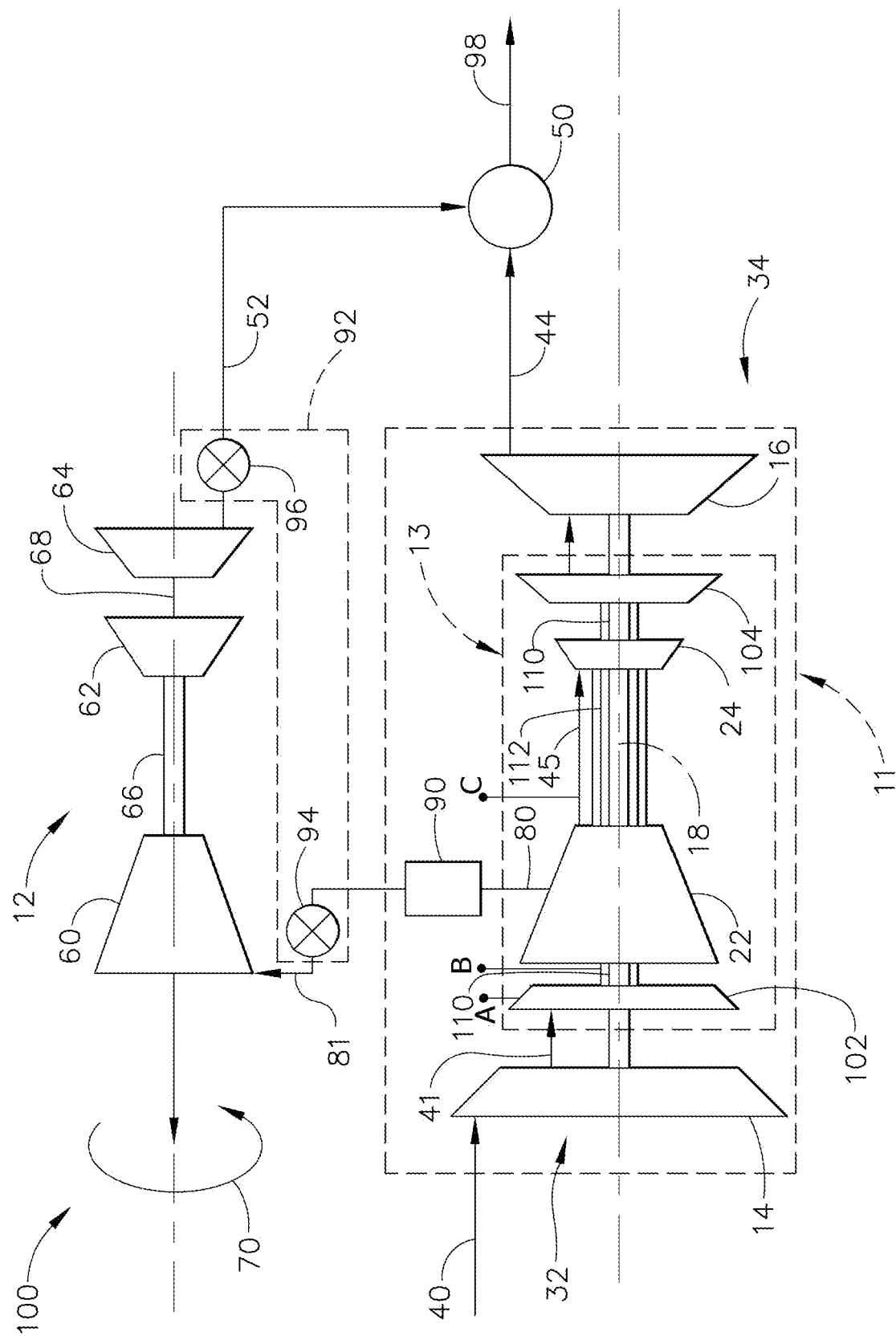
FIG. 2 is an exemplary schematic view of an alternative embodiment of a gas turbine engine assembly.

FIG. 2 is an exemplary schematic view of an alternative embodiment of a gas turbine engine assembly 100 including a propelling gas turbine engine 11 and an auxiliary power unit or auxiliary power engine 12 that are coupled together, as described in more detail below, in a combined cycle. Engine 100 is substantially similar to engine 10 shown in FIG. 1 and components in engine 100 that are identical to components of engine 10 are identified in FIG. 2 using the same reference numerals used in FIG. 1. Similarly to gas turbine engine assembly 10, gas turbine engine 100, as described in more detail below, facilitates producing shaft power and propelling force for an aircraft (not shown).

Gas turbine engine 11 includes core engine 13, fan assembly 14, low pressure turbine assembly 16, a booster fan 102, and a booster turbine 104. Fan assembly 14 and low pressure turbine 16 are coupled by first shaft 18. Booster fan 102 and booster turbine 104 are coupled together by a second shaft 110, and compressor 22 and high pressure turbine 24 are coupled by a third shaft 112. Core engine 13 includes core drive fan 20, high-pressure compressor 22, a combustor (not shown), and high-pressure turbine 24. In the exemplary embodiment, booster fan 102, compressor 22, the combustor, and turbines 24, 26, and 16 are coupled together in axial flow communication. Gas turbine engine 11 also includes an inlet side 32 and an exhaust side 34.

In operation, inlet air, represented by arrow 40, enters fan assembly 14, wherein the air is compressed and is discharged downstream, represented by arrow 41, at an increased pressure and temperature towards core engine 13 and more specifically, towards booster fan 102 wherein the air is channeled towards compressor 22. In one embodiment, engine 11 includes a bypass duct (not shown), such that a portion of air 41 discharged from fan assembly 14 is channeled into the bypass duct rather than entering core engine 11.

Auxiliary power engine 12 is coupled in flow communication to engine 102 via auxiliary ducting (not shown) such that a portion of compressed air 41 channeled towards core engine 13 may be directed to auxiliary power engine 12. More specifically, in the exemplary embodiment, auxiliary airflow 80 is extracted from core engine 13 at a location upstream from core engine turbine 24. Moreover, in the exemplary embodiment, airflow 80 is bled from high-pressure compressor 22 and is routed towards auxiliary engine compressor 60. In an alternative embodiment, auxiliary power engine 12 is coupled in flow communication to a pair of engines 100 and receives high pressure airflow 80 from each engine 100. In another alternative embodiment, a pair of auxiliary power engines 12 are coupled in flow communication to a single engine 100 and both receive high pressure airflow 80 from engine 100. More specifically, in the exemplary embodiment, compressor 22 is a multi-staged compressor and air 80 may be extracted at any compressor stage within compressor 22 based on pressure, temperature, and flow requirements of auxiliary engine 12.

In another embodiment, air 80 is extracted upstream or downstream from compressor 22 from any of, or any combination of, but is not limited to being extracted from, a booster interstage, a booster discharge, a fan interstage, a fan discharge, a compressor inlet, a compressor interstage, or a compressor discharge bleed port. In a further alternative embodiment, air 80 is extracted upstream from compressor 22. In another embodiment, air is extracted from any of, or any combination of, but is not limited to being extracted from, a location intermediate fan assembly 14 and booster fan 102, intermediate booster fan 102 and compressor 22, and intermediate compressor 22 and turbine 24. Referring to FIG. 2, "A", "B", and "C" represent exemplary locations from which air may be extracted from core engine (13) for use by auxiliary power engine (12).

The above-described power system is cost-effective and increases shaft power production. The power system includes an auxiliary turbine engine coupled in flow communication with a gas turbine engine including a booster turbine, such that inlet air provided to the auxiliary turbine is drawn from air flowing through the core engine. As such, higher density air is provided to the auxiliary engine than would be provided had the auxiliary engine received ambient inlet airflow through conventional means, such as through normally aspired means. Accordingly, a small amount of high-pressure air taken from the main engine will enable a smaller engine to output power levels similar to those of sea level operation. As a result, the increased density of air facilitates increased shaft turbine power production from the auxiliary engine in a cost-effective and reliable manner.

Exemplary embodiments of gas turbine assemblies are described above in detail. The assemblies are not limited to the specific embodiments described herein, but rather, components of each assembly may be utilized independently and separately from other components described herein. For example, each turbine component and/or auxiliary turbine engine component can also be used in combination with other core engine and auxiliary turbine engine components.

While the invention has been described in terms of various specific embodiments, those skilled in the art will recognize that the invention can be practiced with modification within the spirit and scope of the claims.

What is claimed is:

1. A method for assembling a gas turbine engine assembly, said method comprising:

providing at least one propelling gas turbine engine that includes a fan assembly and a core engine including a core drive fan, a high pressure compressor, and a high pressure turbine coupled together in serial-flow arrangement; and coupling an auxiliary engine to the propelling gas turbine engine such that during operation of the propelling gas turbine engine, at least a portion of the airflow entering the propelling gas turbine engine is selectively extracted from at least one of the core drive fan and the high pressure compressor, and channeled to the auxiliary engine for generating power, wherein the auxiliary engine includes an inlet, a compressor, and at least one turbine.

2. A method in accordance with claim 1 wherein coupling an auxiliary engine to the propelling gas turbine engine further comprises coupling the auxiliary engine to the propelling gas turbine engine such that during operation of the propelling gas turbine engine, airflow is selectively extracted from the propelling gas turbine engine upstream from the high pressure turbine and is channeled to the auxiliary engine at a higher pressure than a pressure of the airflow entering the propelling gas turbine engine.

3. A method in accordance with claim 1 wherein coupling an auxiliary engine to the propelling gas turbine engine further comprises coupling the auxiliary engine to the propelling gas turbine engine such that during operation of the propelling gas turbine engine, airflow is extracted from at least one interstage location of the compressor between an inlet and a discharge of the compressor.

4. A method in accordance with claim 1 wherein providing at least one propelling gas turbine engine further comprises providing the core drive fan upstream from the core engine high pressure compressor and rotatably coupled to the high pressure turbine.

5. A method in accordance with claim 1 further comprising coupling a control system to the auxiliary engine, the control system including at least one adjustable air throttle valve to the auxiliary engine to selectively control extraction of air from the propelling engine.

6. A gas turbine engine assembly comprising:

at least one propelling gas turbine engine comprising a fan assembly and a core engine assembly downstream from said fan assembly, said core engine comprising a core drive fan, a high pressure compressor, and a high pressure turbine assembly coupled together in serial-flow arrangement; and an auxiliary engine used for generating power, said auxiliary engine comprising at least one turbine and an inlet, said inlet coupled upstream from said turbine and in flow communication with said propelling gas turbine engine core engine, such that a portion of airflow entering said at least one propelling gas turbine engine is extracted from at least one of the core drive fan and the high pressure compressor, for use by said auxiliary engine.

7. A gas turbine engine assembly in accordance with claim 6 wherein said auxiliary engine receives air that has been extracted from said at least one propelling gas turbine engine upstream from said core engine high pressure turbine assembly.

8. A gas turbine engine assembly in accordance with claim 6 wherein said auxiliary engine receives airflow extracted from at least one of an interstage of said compressor and a discharge of said compressor.

* * * * *